Feb. 25, 1964     W. E. OAKES     3,121,970
FISH FLY HOLDER
Filed June 20, 1962
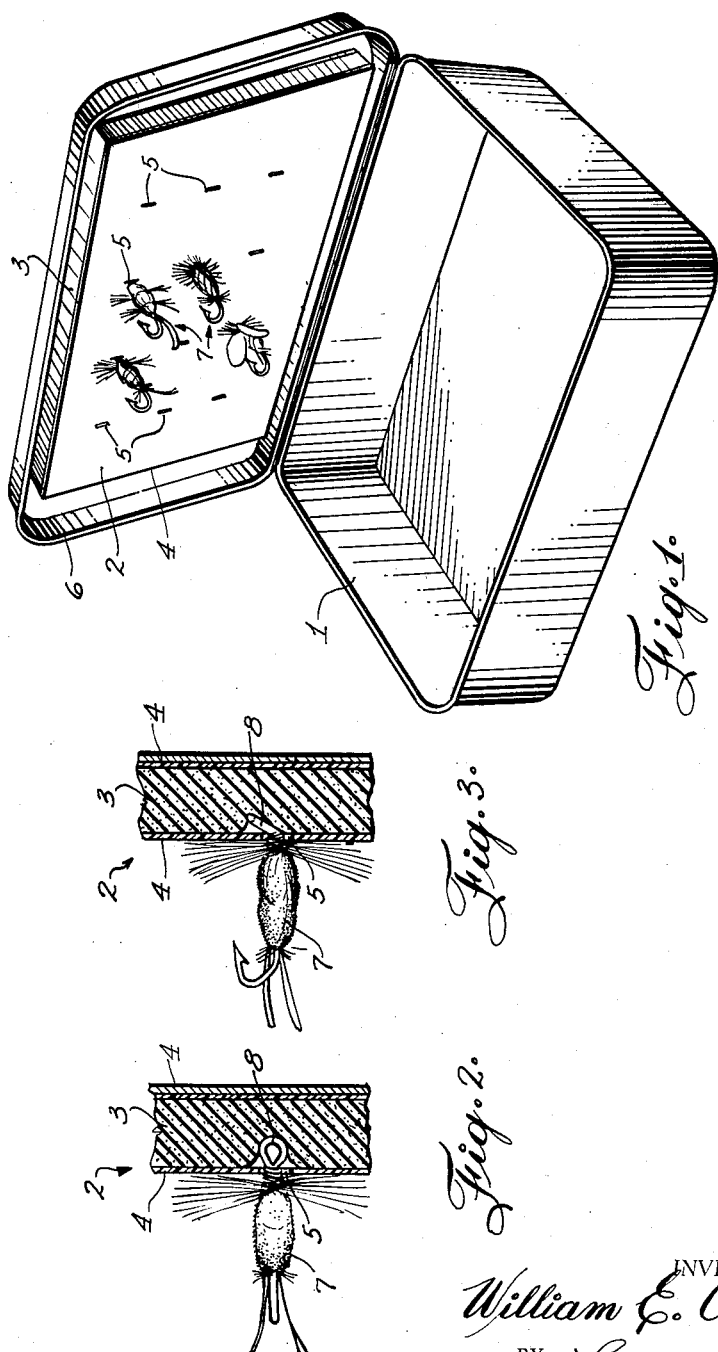
INVENTOR
William E. Oakes
BY Harvey A. Weir
PATENT AGENT

United States Patent Office 3,121,970
Patented Feb. 25, 1964

3,121,970
FISH FLY HOLDER
William E. Oakes, 11415 67th St.,
Edmonton, Alberta, Canada
Filed June 20, 1962, Ser. No. 203,763
2 Claims. (Cl. 43—57.5)

This invention relates to fish fly holders.

It is well recognized in the art that it is desirable to provide holders for a variety of fish flies in order that such flies may be adequately and conveniently displayed for selection of a required fly. However, holders for this purpose heretofore available frequently comprise costly and complicated structures as well as limitation as to the number of flies receivable in such holders, and convenience of mounting and release of the flies therein.

It is an object of this invention to provide a simple fly holder of convenient manufacture, which is capable of receiving a large number of flies in a minimum of space, and in which each fly may be quickly and easily mounted and withdrawn therefrom.

Another object is to provide a fly holder wherein the flies mounted therein are disposed in rows wherein each fly is clearly visible as to size and color.

Another object is to provide a fly holder wherein each fly is displayed with the wings, body and hackles thereof in natural position.

Another object is to provide a fly holder wherein the flies are securely held against accidental dislodgment even though subjected to extreme conditions.

Another object is to provide a fly holder wherein the flies are supported in such manner that entanglement thereof, as well as damage thereto, is substantially prevented.

The invention will be described with reference to the accompanying drawing, in which FIGURE 1 is a perspective view of a fly holder in accordance with the invention, FIGURE 2 is an enlarged partial sectional view of a holder member, showing the initial position of a fly therein, and FIGURE 3 is a partial sectional view of the holder member showing the locked position of a fly therein.

Referring to the drawing, 1 is a box of conventional form constructed of metal, plastic composition or the like. Mounted in the box is a holder member 2 comprising a flat-faced panel or pad of a compressibly resilient body 3 of sponge rubber, plastic or the like to each of the flat side surfaces of which is bonded a thin sheest 4 of plastic composition such as polyethylene. While the thickness of the body 3 may vary, it need not be substantially greater than one-eighth inch.

One of the sheets 4 is provided with a plurality of rows of slits 5. Preferably each slit 5 comprises simply a cut of uniform width from end to end with the edges thereof normally abutting each other. The length of each slit is approximately equal to the diameter of the eye of the fish fly to be mounted in the holder whereby such eye may be inserted through the slit with the eye parallel thereto. The slits are spaced apart in each row a distance corresponding to the eye of fly hooks to be mounted. For instance, a one-half inch spacing is satisfactory for the average size of trout fly.

With particular reference to FIGS. 2 and 3 it will be noted that the portion of the pad which is contiguous to and aligned with the slit 5 is unattached and free and capable of deforming itself when subjected to end thrust pressure applied thereto by way of the eye 8. With this cosntruction and arrangement it will be evident that the stated eye can be forcibly but turnably embedd in the deformable portion of the pad. It follows too that the deformable portion is capable of yielding to the pressure is imposed thereon by the eye. Accordingly, it permits the eye to be rotated whereupon the eye assumes the intended angular position relative to the lengthwise dimension of the slit and is therefore retained against accidental displacement or removal.

Preferably, the panel 2 is mounted in the box by adhesive or otherwise securing the unslit sheet 4 thereof to the lid 6 of the box, as shown in FIGURE 1.

In use, flies, as indicated at 7, are mounted in the holder member. As shown in FIGURE 2, each fly is initially inserted through a slit 5 by passing the eye 8 through the slit in parallel relation thereto. Thereafter, as shown in FIGURE 3, the fly is rotated through a one-quarter turn which locks the fly in standing position in the holder.

It will be apparent that the holder described lends itself to rapid and convenient mounting of flies therein as well as removal therefrom. Moreover, the holder accommodates a large number of flies in a compact space. For instance, twenty (20) average sized trout flies may be mounted in a holder panel 2½" x 3". Since the panel is flat and the flies are mounted on only one side thereof, all of the flies, each in natural form, are simultaneously and clearly visible.

Since each fly is individually and reliably mounted, there is no need to compartment the flies and entanglement and crushing thereof are avoided. Moreover, the secure locking of each fly effectively prevents accidental dislodgement thereof even if exposed to high winds, subjected to sudden jars, or dropped into the water.

It will also be apparent that the holder described may be employed for fly display purposes as well as for use by fishermen.

I claim:

1. For use when desiring to protectively but accessibly store fishing flies in a fly box; a fly holder comprising: a sponge rubber pad having a pair of spaced parallel flat surfaces, one of said surfaces being adapted to be connected with and supported from a flat interior surface of a fly box, a relatively thin sheet of plastic material superimposed upon, covering, and bonded to the other surface of said pad, said cover sheet having at least one elongated slit opening through the inner and outer surfaces thereof, the lengthwise edges of said slit abutting each other from end to end, that portion of said pad which is contiguous to and alined with said slit being free to deform itself when subjected to end thrust pressure, and a fishing fly embodying a fish hook having a shank terminating in a line attaching eye, the length of said slit being substantially equal to the diameter of said eye and permitting the eye to be lined up with and forced through the slit and forcibly embedded in said deformable portion of the pad, said deformable portion being capable of yielding to the pressure of the eye and permitting said eye to be rotated one-quarter of a turn whereupon the eye assumes an angular position relative to the lengthwise dimension of the slit and is accordingly retained against accidental displacement.

2. For use in storing fishing flies, a sponge rubber pad having spaced parallel surfaces, one of which is adapted to be fastened flatwise to a flat interior surface existing in the closing lid of a fly box, a complemental relatively thin sheet of plastic material superimposed upon and bonded to the other flat surface of said pad, said sheet of material having at least one elongated cut therein, said cut defining a shank and eye accommodating slit, the opposed lengthwise edge portions of said slit being normally in abutting contact from end-to-end but capable of being wedged and spread apart, and a fishing fly embodying a fish hook having a shank with a line eye, said slit being of a length substantially equal to the diameter of said eye and said slit permitting said eye to be aligned therewith and shoved forcibly therethrough and then turned to assume a plane at right angles to the lengthwise dimension of the slit, that portion of the pad which is contiguous to and aligned with said slit being free to deform itself in a manner which permits axial turning of the hook's shank but at the same time imposes a retentive force on the eye to guard against accidental turning and displacement of said eye once it has forcibly lodged itself in its retainable position in the deformed portion of the pad.

References Cited in the file of this patent

UNITED STATES PATENTS

| | | |
|---|---|---|
| 1,133,542 | Deal | Mar. 30, 1915 |
| 1,482,678 | Figley | Feb. 5, 1924 |
| 2,065,234 | Martinez | Dec. 22, 1936 |
| 2,242,521 | Heiner | May 20, 1941 |
| 2,514,451 | Krissoff | July 11, 1950 |
| 2,702,442 | Wallen | Feb. 22, 1955 |